United States Patent Office 3,293,306
Patented Dec. 20, 1966

3,293,306
PERFLUORINATED ETHER ALCOHOLS
Ronald Eugene Le Bleu, Wilmington, and John Hartwell Fassnacht, Newark, Del., assignors to E. I. du Pont de Nemours and Company, Wilmington, Del., a corporation of Delaware
No Drawing. Filed June 14, 1963, Ser. No. 287,777
5 Claims. (Cl. 260—615)

This application is a continuation-in-part of our copending application Serial No. 247,510, filed December 27, 1962, now abandoned.

This invention is directed to novel alcohols of the structure $X-CF_2CF_2O(CFXCF_2O)_nCFXCH_2OH$, wherein X is fluorine or trifluoromethyl and $n$ is from one to fifty. It is also directed to the phosphate di-esters of these alcohols and to methods for preparing these alcohols and esters.

It is therefore an object of this invention to provide a new class of perfluorinated alcohols and the phosphate di-esters thereof. It is another object of this invention to provide a new and novel class of perfluorinated alcohols possessing properties heretofore not exhibited by known perfluorinated alcohols. It is a further object of this invention to provide a novel process for preparing this new class of perfluorinated alcohols. These and other objects will become apparent from the following description and claims.

More specifically, the present invention is directed to compounds of the structure $$X-CF_2CF_2O(CFXCF_2O)_nCFXCH_2OH$$

wherein $n$ is an integer of from one to fifty and wherein X is chosen from the group consisting of fluorine and trifluoromethyl.

This invention is also directed to a novel process for preparing compounds of the structure $$X-CF_2CF_2O(CFXCF_2O)_nCFXCH_2OH$$

wherein $n$ is from one to fifty and X is selected from the group consisting of fluorine and the trifluoromethyl group, which process comprises reducing compounds of the structure $X-CF_2CF_2O(CFXCF_2O)_nCFXCOF$ with an alkali metal borohydride in an inert solvent.

The novel compositions of the present invention have the structure $CF_3CF_2O(CF_2CF_2O)_nCF_2CH_2OH$ and $CF_3CF_2CF_2O[CF(CF_3)CF_2O]_nCF(CF_3)CH_2OH$. They are prepared by reduction of the corresponding acid fluorides $CF_3CF_2O(CF_2CF_2O)_nCF_2COF$ and $$CF_3CF_2CF_2O[CF(CF_3)CF_2O]_nCF(CF_3)COF$$

with an alkali metal borohydride ($MBH_4$ where M is an alkali metal) in an inert solvent. The acid fluorides are prepared by polymerization of tetrafluoroethylene oxide,

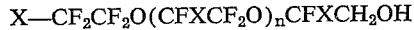

or hexafluoropropylene oxide,

either in the presence of activated carbon or ionic salts such as alkali fluorides, quaternary ammonium fluorides or quaternary ammonium salts which are readily converted to fluorides such as the cyanides. The acid fluorides may also be prepared by the reaction of trifluoroacetyl fluoride with tetrafluoroethylene oxide or pentafluoropropionyl fluoride with hexafluoropropylene oxide in the presence of quaternary ammonium fluorides as above.

Representative examples illustrating the preparation of the starting materials which are used in the practice of the present invention follow.

The following example illustrates the use of the general procedure to specifically prepare the acid fluoride of the structure $CF_3CF_2CF_2OCF(CF_3)CF_2OCF(CF_3)COF$, which acid fluoride is one of the starting materials of the present invention. Hexafluoropropylene oxide was bubbled into a stirred solution of 20 parts of cesium fluoride in 208 parts of acetonitrile at 40–45° C. The crude product was separated and periodically withdrawn into a distillation apparatus wherein the product $$CF_3CF_2CF_2OCF(CF_3)COF$$

B.P. 56° C., was fractionally distilled from the reaction mass and returned to the reaction vessel. The residue in the distillation apparatus consisted of $$CF_3CF_2CF_2OCF(CF_3)CF_2OCF(CF_3)COF$$

B.P. 108–110° C. (82% yield) and $$CF_3CF_2CF_2O[CF(CF_3)CF_2O]_2CF(CF_3)COF$$

B.P. 165° C. (8.3% yield). Conversion of hexafluoropropylene oxide was 100%.

The following example illustrates the use of the general procedure to specifically prepare several of the acid fluorides used as starting materials in the present invention. Under a dry nitrogen atmosphere, 28.6 parts of "Darco" 12 x 20 mesh activated carbon were placed in a stainless steel cylinder. The sealed cylinder was cooled in liquid nitrogen and 400 parts of hexafluoropropylene oxide was charged into the cylinder. The reaction mixture was cooled to from about −10° C. to −15° C. where it was maintained for three days. The product was then fractionally distilled. Products of the following characteristics were obtained.

| Product<br>$CF_3CF_2CF_2O[CF(CF_3)CF_2O]_nCF(CF_3)COF$ | Boiling Point,<br>° C./mm. Hg |
|---|---|
| 4 | 53–63/0.3 |
| 5 | 63–76/0.35 |
| 6 | 81–100/0.4 |
| 7 | 100–112/0.35 |
| 10 | 138–156/0.4 |
| 11 | 156–173/0.4 |
| 12 | 170–185/0.4 |
| 14 | 190–205/0.4 | n = (average).

The conversion of hexafluoropropylene oxide was about 75%.

The following example also illustrates the use of the general procedure to specifically prepare several of the acid fluorides used as starting materials in the present invention. Tetrafluoroethylene oxide was added in portions to a stirred mixture of tetraethylammonium cyanide in 1-chloro-2,2,3,3-tetrafluoropropane, maintained at less than −25° C. in a stainless steel pressure vessel, maintaining the pressure below 30 p.s.i.g. Fractional distillation of the reaction mixture gave a series of products having the characteristics shown below. The conversion of tetrafluoroethylene oxide was 100%.

| Product<br>$CF_3CF_2O(CF_2CF_2O)_nCF_2COF$ | Boiling Point,<br>° C./mm. Hg |
|---|---|
| 1 | 0–6/760 |
| 2 | 65–68/760 |
| 3 | 99–102/760 |
| 4 | 134–138/760 |
| 5 | 167–170/760 |
| 6 | 199–202/760 |
| 7 | 230/760 |
| 8 | 105–120/1 |
| 9–10 | 122–144/1 |
|  | 144–152/1 | n=0.

Compounds wherein $n$ is from 11–50 are also obtained but are not readily separated by distillation.

An alternate procedure for obtaining a particular product $CF_3CF_2O(CF_2CF_2O)_nCF_2COF$ where $n$ has a specific average value is carried out by adding tetrafluoroethylene oxide to perfluoroacetyl fluoride in the presence of tetraethylammonium cyanide in 1-chloro-2,2,3-3-tetrafluoropropane similar to the procedure used above. Cesium fluoride may also be used in place of the tetraethylammonium cyanide. If a particular value of $n$ is desired, for example where the value of $n$ is desired to be 5, four moles of tetrafluoroethylene oxide are added to one mole of perfluoroacetyl fluoride.

The reduction of the acid fluorides to the corresponding alcohols is accomplished by reaction of the acid fluorides with an alkali metal borohydride such as sodium borohydride in an inert solvent. In general, ether type solvents are preferable for this reaction. These inert solvents, of course, must be dry. Dioxane is the preferred inert solvent. Other inert reaction solvents which may be used in this invention include diethyl ether, dibutyl ether, tetrahydrofuran, hydrocarbons, halogenated hydrocarbons such as carbon tetrachloride and the like. The primary function of the reaction solvent is to remove heat from the reaction mixture as the acid fluorides are not generally soluble in these solvents. Solvents containing functional groups which react with either the acid fluorides or the borohydrides are not inert to the reactants and thus are not useful in this invention, e.g., alcohols, esters, acids, amines, nitriles, aldehydes or ketones. The temperature at which reduction is carried out is not critical. The reduction is preferably carried out at room temperature or above because it is convenient and avoids the special cooling equipment needed for lower temperatures. The upper temperature limit is determined by the boiling point of the solvent. The preferred temperature of reaction with dioxane as the inert reaction solvent is 60–70° C.

The reaction is best carried out by the slow addition of the acid fluoride, either alone or as a mixture with the reaction solvent, to a slurry of the borohydride in the solvent. The addition should be carried out under carefully controlled conditions since there usually is considerable heat evolved in the reaction. The reaction mixture is generally stirred for a period of time after the addition of the acid fluoride is complete; for example, from one-half to three hours. The reaction mixture, if above room temperature, is allowed to cool to about room temperature, and, at this point, water is cautiously added to destroy any excess borohydride which may be present. The desired product is then separated from the aqueous mixture, dried and purified if so desired.

Sodium borohydride is the best known borohydride and is commercially available. It is the preferred alkali metal borohydrides that can be utilized in this process. Other alkali metal borohydrides such as lithium borohydride, potassium borohydride and the boron hydride complexes with dialkyl amines can be utilized in the present process in the place of sodium borohydride to produce substantially the same results; however, they are more expensive than the preferred sodium borohydride. Aluminum hydrides such as lithium aluminum hydride do not appear to be useful in the present process.

The product alcohols $CF_3CF_2O(CF_2CF_2O)_nCF_2CH_2OH$ and

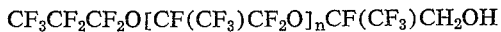

may have values of $n$ of from one to about fifty. The value of $n$ in these alcohols depends, of course, on the nature of the acid fluorides from which they are prepared. Acid fluorides are available with values of $n$ from one to fifty, hence the corresponding alcohols of these fluorides may be prepared by this process.

The alcohols of this invention behave in many respects like ordinary fluorinated alcohols. Thus, derivatives which are formed by replacement of the hydroxyl group hydrogen of the alcohols are readily prepared from the alcohol of this invention; for example, carboxylic acid and sulfonic acid esters are easily formed by reaction with the corresponding acid halides or acid anhydrides in the usual manner. The alcohols of this invention also undergo reaction readily with cyanuric chloride and like compounds. Like other highly fluorinated alcohols, the present alcohols do not undergo ready replacement of the hydroxyl group itself.

The alcohols of this invention are thermally stable compounds which form thermally stable derivatives. For example, the derivatives formed from the alcohols of this invention with pyromellitic acid or anhydride, or cyanuric chloride are thermally stable fluids which are useful as lubricants and for similar applications. These derivatives are particularly useful since they possess wider liquid ranges than similar derivatives prepared from the known perfluoroalcohols $H(CF_2CF_2)_nCH_2OH$ and $F(CF_2)_nCH_2OH$. In particular, these derivatives when prepared from the alcohols of this invention remain fluid at much lower temperatures than similar derivatives when prepared from the known perfluorinated alcohols. The alcohols, similar to the alcohols of this invention, wherein $n$ is zero do not form derivatives having sufficiently high boiling points to be useful as lubricants and the like as the derivatives formed from the alcohols of this invention and described above.

The alcohols of this invention themselves have lower melting points than the perfluorinated alcohols of the art of similar molecular weight. For example, the perfluorinated alcohol $H(CF_2)_8CH_2OH$ of the art has a melting point of 60–65° C. The alcohol of this invention

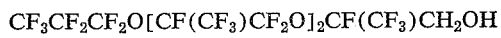

of similar molecular weight to $H(CF_2)_8CH_2OH$ has a pour point of −30° to −35° C. This low melting point property increases the utility of the alcohols of this invention as solvents and reaction media over those of the art for low temperature applications.

One of the outstanding uses for the alcohols of this invention is in the production of their corresponding phosphate di-esters which exhibit excellent oil-repellent properties. The oil-repellent properties of these phosphates are somewhat surprising since the chemical structure of these compounds is not typical of prior art materials which excel in this respect.

The phosphate di-esters of this invention have the following formula

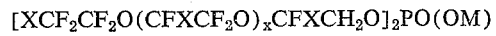

where X is a member of the group consisting of F and $CF_3$, $x$ is an integer from 1 to 8, and M is a water-solubilizing cation. Typical of these water-solubilizing cations are those obtained when M is hydrogen, an alkali metal (Li, K, Na, etc.) as well as ammonium ions and substituted ammonium ions, such as diethanolamine and morpholine.

Specific illustrations of the phosphate esters coming within the scope of this invention are the following compounds.

(1) Bis(1H,1H - hendecafluoro-3,6-dioxaoctyl) phosphate:

(2) Bis(1H,1H - pentadecafluoro-3,6,9-trioxahendecyl) phosphate:

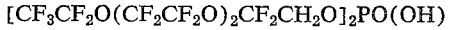

(3) Bis(1H,1H - nonadecafluoro-3,6,9,12-tetroxatetradecyl) phosphate:

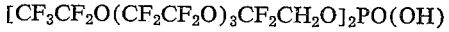

(4) Bis(1H,1H - heptacosafluoro - 3,6,9,12,15,18-hexoxaeicosyl) phosphate:

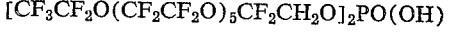

(5) Bis[1H,1H - tetradecafluoro - 2,5,8-tris(trifluoromethyl)-3,6,9-trioxadodecyl] phosphate:

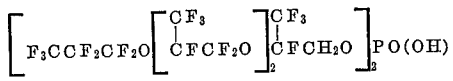

(6) Bis[1H,1H - hendecafluoro - 2,5 - bis(trifluoromethyl)-3,6-dioxanonyl] phosphate:

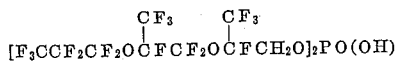

(7) Bis[1H,1H - heptadecafluoro-2,5,8,11-tetrakis(trifluoromethyl)-3,6,9,12-tetroxapentadecyl] phosphate:

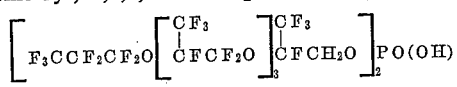

(8) Bis[1H,1H - tricosafluoro - 2,5,8,11,14,17-hexakis(trifluoromethyl)-3,6,9,12,15,18-hexoxaheneicosyl] phosphate:

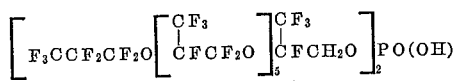

The specific compounds set forth above are shown in their free acid form. However, it will be quite obvious to one skilled in the art that these acids can be easily converted to their corresponding salts. In fact, the ammonium salts are preferred materials of this invention. Specific illustrations of preferred ammonium salts and other phosphate salts of this invention are as follows.

(a) The ammonium of bis(1H,1H-hendecafluoro-3,6-dioctaoctyl) phosphate:

(b) The ammonium salt of bis(1H,1H-pentadecafluoro-3,6,9-trioxahendecyl) phosphate:

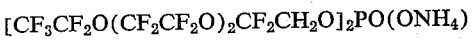

(c) The sodium salt of bis(1H,1H-nonadecafluoro-3,6,9,12-tetroxatetradecyl) phosphate:

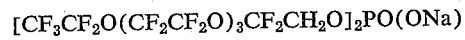

(d) The potassium salt of bis(1H,1H-heptacosafluoro-3,6,9,12,15,18-hexoxaeicosyl) phosphate:

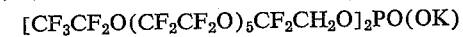

The novel phosphates of this invention may be prepared in one of several ways. In one method, two mols of the alkanol of this invention are reacted with one mol of phosphorus oxychloride or phosphorus oxybromide in the presence of a tertiary amine acid acceptor in the optional presence of a non-proton donating solvent. The reaction is preferably effected during the first stage, when the reactants are brought into contact, at 0° to 25° C. and then finished by heating the mixture at a reflux temperature of 50° C. to 150° C. The phosphorochloridate product of this reaction is then hydrolyzed to the required phosphate ester. Any tertiary amine that contains no other functional group may be used as an acid acceptor in the above reaction. Examples are pyridine, 2,6-dimethylpyridine, trimethylamine, triethylamine, tripropylamine, N,N-dimethylaniline, and the like. Specific satisfactory solvents are benzene, toluene, chlorobenzene, hexane, octane, mixed alkanes, 1-chlorobutane, carbon tetrachloride, propyl ether, butyl ether, dioxane.

The alkanols may also be reacted with phosphorus pentoxide to synthesize the invention phosphates. For this reaction three mols of the polyfluoropolyoxa-alkanamidoalkanol are mixed with one mol of phosphorus pentoxide, and the mixture is heated between 30° and 200° C. without the use of a solvent or base. Both the mono- and the di-ester are formed. These esters are separated or the mixture of esters may be used as obtained.

Still another method for preparing the invention phosphates is to make the corresponding phosphites, oxidize the phosphites with nitrogen dioxide or chlorinate the phosphite and hydrolyze the product to the required phosphate. This series of steps may be summarized and illustrated as follows.

STEP 1.—FORMATION OF PHOSPHITE

*Method A.*—Ester-interchange with an available dialkyl phosphite:

$$2GOH + (RO)_2PHO \rightarrow (GO)_2PHO + 2ROH$$

wherein G represents

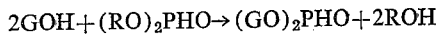

with X, n, $R_1$ and $R_2$ being the same as defined above and R being methyl, ethyl, or the like.

*Method B.*—Direct reaction with $PCl_3$.

(a) Preparation of $(GO)_3P$:

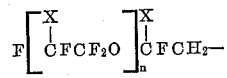

(b) Conversion to $(GO)_2PHO$:

$$(GO)_3P + H_3PO_3 \rightarrow 3(GO)_2PHO$$

STEP 2.—OXIDATION OF PHOSPHITE TO PHOSPHOROCHLORIDATE $$(GO)_2PHO + Cl_2 \rightarrow (GO)_2POCl + HCl$$

STEP 3.—HYDROLYSIS TO PHOSPHATE

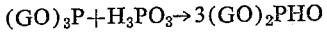

In any of the foregoing procedures the products may be isolated as the free acid (M=H) and then converted to an alkali metal (sodium or potassium), ammonium, or substituted ammonium salt by neutralization with the appropriate base. Convenient bases for obtaining substituted ammonium salts include methylamine, diethylamine, monoethanolamine, diethanolamine, triethanolamine, morpholine.

For a clearer understanding of the invention, the following specific examples are given. These examples are intended to be merely illustrative of the invention and not in limitation thereof. Unless otherwise specified, all parts are by weight.

*Example I*

$CF_3CF_2CF_2OCF(CF_3)CF_2OCF(CF_3)COF$ (900 parts, 1.8 moles) was added slowly to a rapidly stirred slurry of 45.4 parts of sodium borohydride (1.2 moles) in 1240 parts of dry dioxane under anhydrous conditions at a rate which maintained the temperature at 60–70° C. The addition of materials at the required rate was completed over a 3 hour period. When the addition was complete the reaction mixture was stirred for one and one-half hours at 60° C. The mixture was then cooled to 20° C. and 600 parts of water were added very slowly with caution. Caution is necessary during this step because severe foaming may be encountered. The resulting mixture was stirred rapidly for 12 hours at 60° C., cooled, and then 4000 parts of additional water were added. The resulting mixture separated into two layers which were separated. Adding sodium chloride facilitates separation of the layers. The aqueous layer was extracted with ether and the combined organic layers were dried over magnesium sulfate. The solvent was removed and the residual product was distilled, giving 663 parts, 76.5% yield, of $$CF_3CF_2CF_2OCF(CF_3)CF_2OCF(CF_3)CH_2OH$$

B.P. 155–156° C.

*Analysis.*—Calcd. for $C_9H_3F_{17}O_3$: C, 22.4; H, 0.62; F, 67.0. Found: C, 22.5; H, 0.6; F, 66.8.

*Example II*

Using the procedure of Example I, 625 parts (0.95 mole) of $$CF_3CF_2CF_2O[CF(CF_3)CF_2O]_2CF(CF_3)COF$$

was caused to react with 26.5 parts (0.7 mole) of sodium borohydride in 620 parts of dry dioxane. The reaction product was worked up and the product was isolated as in Example I, giving 533 parts (86% yield) of $$CF_3CF_2CF_2O[CF(CF_3)CF_2O]_2CF(CF_3)CH_2OH$$

B.P. 115° C. at 50 mm., $d_4^{25}$ 1.7685, M.P. ca. −30° to −35° C.

*Analysis.*—Calcd. for $C_{12}H_3F_{23}O_4$: C, 22.2; H, 0.46; F, 67.4. Found: C, 22.0; H, 0.3; F, 67.2.

Example III

Using essentially the same procedure as described in Example I, 139.2 parts (0.4 mole) of $$CF_3CF_2OCF_2CF_2OCF_2COF$$

was caused to react with 12.1 parts (0.32 mole) of sodium borohydride in 518 parts of dry dioxane. After treating the reaction mixture with water and isolating the product as in Example I, the product was redistilled from concentrated sulfuric acid under vacuum giving 89.8 parts (67.5% yield) of $CF_3CF_2OCF_2CF_2OCF_2CH_2OH$ was obtained, B.P. 125° C., $d_4^{25}$ 1.6165.

*Analysis.*—Calcd. for $C_6H_3F_{11}O_3$: C, 21.7; H, 0.91; F, 62.9. Found: C, 21.6; H, 0.8; F, 62.5.

Example IV

Using essentially the same procedure as Example I, 116 parts (0.25 mole) of $$CF_3CF_2O(CF_2CF_2O)_2CF_2COF$$

was caused to react with 7.56 parts (0.2 mole) of sodium borohydride in 518 parts of dry dioxane. After treating with water and isolating the product as in Example I, 89.2 parts (77% yield) of $$CF_3CF_2O(CF_2CF_2O)_2CF_2CH_2OH$$

was obtained, B.P. 149° C., $d_4^{25}$ 1.6597.

*Analysis.*—Calcd. for $C_8H_3F_{15}O_4$: C, 21.4; H, 0.68; F, 63.6. Found: C, 21.4; H, 0.8; F, 62.9.

Example V

Using essentially the same procedure as Example I, 262 parts (0.45 mole) of $$CF_3CF_2O(CF_2CF_2O)_3CF_2COF$$

was caused to react with 13.5 parts (0.35 mole) of sodium borohydride in 414 parts of dry dioxane. After treating with water and isolating the product as in Example I, 179 parts (68% yield) of $$CF_3CF_2O(CF_2CF_2O)_3CF_2CH_2OH$$

was obtained, B.P. 170–173° C.

*Analysis.*—Calcd. for $C_{10}H_3F_{19}O_5$: C, 21.3; H, 0.53; F, 64.0. Found: C, 21.4; H, 0.5; F, 64.0.

Example VI

Using essentially the same procedure as Example I, 300 parts (ca. 0.32 mole) of the acid fluoride $$CF_3CF_2O(CF_2CF_2O)_nCF_2COF$$

wherein *n* is 5–6 was caused to react with 8.3 parts (0.22 mole) of sodium borohydride in 300 parts of dry dioxane. After treatment with water as before, the product was isolated by removal of the solvent, giving 250 parts (83% yield) of product. Distillation gave three fractions and a residue as follows: fraction 1, B.P. 100–108° C. at 10–15 mm., 120 parts; fraction 2, B.P. 108–120° C. at 6–7 mm., 62 parts, M.W. 890–902 (*n*=5.5 ave.) and fraction 3, B.P. 84–110° C. at 0.5 mm., 49 parts, M.W. 1080–1089 (*n*=7.2 ave.). The residue consisted of 19 parts.

The calculated analysis for fraction 2, $C_{15}H_3F_{29}O_{7.5}$: C, 21.1; H, 0.35; F, 64.5. *Analysis.*—Found: C, 21.2; H, 0.3; F, 62.7.

Example VII

Using essentially the same procedure as Example I, 200 parts of $CF_3CF_2O(CF_2CF_2O)_9CF_2COF$ was caused to react with 8.3 parts (0.22 mole) of sodium borohydride. The crude product was isolated, after treatment with water, by extraction with trichlorotrifluoroethane and drying, followed by evaporation of the solvent, giving 164 parts of colorless oil. Molecular weight (ebulliscope in trichlorotrifluoroethane): Found, 1315–1325. Calcd. for $CF_3CF_2O(CF_2CF_2O)_9CF_2CH_2OH$, 1315. B.P. 130–155° C. at 1.5 mm.

Example VIII

Using essentially the same procedure as in Example I, 187 parts (0.188 mole) of $$CF_3CF_2CF_2O[CF(CF_3)CF_2O]_4CF(CF_3)COF$$

was caused to react with 14.3 parts (0.376 mole) of sodium borohydride in dry dioxane. The reaction mixture, after treatment with water and removal of the solvent, gave 75 parts (40% yield) of a clear colorless oil of the structure $$CF_3CF_2CF_2O[CF(CF_3)CF_2O]_4CF(CF_3)CH_2OH$$

Example IX

A mixture of 300 parts (0.62 mole) of $$CF_3CF_2CF_2OCF(CF_3)CF_2OCF(CF_3)CH_2OH$$

prepared in Example I, 29 parts (0.13 mole) of pyromellitic dianhydride and 2 parts of concentrated sulfuric acid was stirred while heated at the reflux temperature. Water which distilled from the reaction mixture was collected. After the theoretical amount of water was removed, which took about 6 hours, the reaction mixture was cooled and neutralized with aqueous sodium hydroxide. The aqueous layer was separated from the organic layer and the latter was clarified with charcoal, dried over magnesium sulfate and filtered. The unreacted alcohol was removed by distillation and the product was devolatilized by heating at 150° C. at 1.5 mm. for 2 hours while passing a slow stream of nitrogen through the mass, giving 172 parts (63% yield) of 1,2,4,5-$C_6H_2[CO_2CH_2CF(CF_3)$
$$OCF_2CF(CF_3)OCF_2CF_2CF_3]_4$$

*Analysis.*—Calcd. for $C_{46}H_{10}F_{68}O_{16}$: C, 26.2; H, 0.5; F, 61.2. Found: C, 26.2; H, 0.4; F, 60.8.

The product of this example is a useful lubricant for high temperature engine applications.

Example X

A mixture of 360 parts (0.55 mole) of $$CF_3CF_2CF_2O[CF(CF_3)CF_2O]_2CF(CF_3)CH_2OH$$

prepared in Example II, 24 parts (0.11 mole) of pyromellitic dianhydride and 1.8 parts of concentrated sulfuric acid was heated at 160° C. under reflux at reduced pressure. Any water which formed was collected. When water removal was complete, the product was neutralized, clarified, dried and devolatilized as in Example X, giving 242 parts (79% yield) of 1,2,4,5-$C_6H_2[CO_2CH_2CF(CF_3)$
$$O(CF_2CF(CF_3)O)_2CF_2CF_2CF_3]_4$$

*Analysis.*—Calcd. for $C_{58}H_{10}F_{92}O_{20}$: C, 25.1; H, 0.36; F, 63.2. Found: C, 25.1; H, 0.2; F, 63.0.

The product of this example is a useful lubricant for high temperature engine applications.

Example XI

The sodium salt of the polyfluorinated alcohol of the structure $CF_3CF_2CF_2OCF(CF_3)CF_2OCF(CF_3)CH_2OH$, which alcohol was prepared in Example I, was prepared by slowly and carefully adding 20 parts (0.04 mole) of the alcohol to a slurry of 1.1 parts (0.045 mole) of sodium hydride in 50 parts of anhydrous diethyl ether.

Then, 2.4 parts (0.013 mole) of cyanuric chloride was added. When precipitation of sodium chloride was complete, the salt was collected by filtration and then the solvent was removed from the filtrate, leaving 23 parts (100% yield) of crude cyanurate ester. Distillation gave 15 parts (75%) in two fractions: fraction 1, B.P. 118–120° C. at 0.3 mm. and fraction 2, B.P. 120–125° C. at 0.2 mm.

*Analysis.*—Calcd. for $C_{30}H_6F_{51}N_3O_9$: C, 23.7; H, 0.4; F, 63.7. Found: C, 23.8; H, 0.2; F, 64.0.

The product of this example is a useful lubricant for high temperature engine applications.

The following examples illustrate the conversion of the polyfluoropolyoxa-alkyl phosphate of this invention to the phosphate di-esters.

*Example XII.—Ammonium bis(1H,1H-hendecafluoro-3,6-dioxaoctyl) phosphate*

A dry reaction vessel blanketed with dry nitrogen is charged with 10 parts of benzene and 1.53 parts (0.01 mol) of phosphorus oxychloride ($POCl_3$) and cooled to between 5° and 10° C. To the agitated benzene solution is gradually added a mixture of 6.64 parts (0.02 mol) of 1H,1H-hendecafluoro-3,6-dioxa-1-octanol and 2.14 parts (0.02 mol) of 2,6-lutidine, keeping the temperature of the reaction mass at 5° C. to 10° C. The reaction mass is then refluxed for one hour and cooled to 50° C. when 1.07 parts of 2,6-lutidine and 1.26 parts of water are added. The mass is again refluxed for one hour, cooled, treated with 10 parts of water, and allowed to settle. The separated bottom layer is washed repeatedly with hot (ca. 80° C.) water and dried, first under vacuum and then by distillation of added benzene. The resultant phosphate is a tan liquid which is dissolved in anhydrous ether and converted to the ammonium salt by bubbling ammonia gas through the solution. The solvent is removed under vacuum, and the desired ammonium bis(1H,1H-hendecafluoro-3,6-dioxaoctyl) phosphate is obtained in 91% yield as a viscous liquid, identified by analysis as follows.

Calculated for $C_{12}H_8F_{22}NO_8P$: C=19.4%; H=1.1%; F=56.3%; N=1.9%; P=4.2%. Found: C=20.5%; H=1.1%; F=58.9%; N=1.7%; P=4.2%.

The above procedure is repeated using 11.28 parts (0.02 mol) of 1H,1H-nonadecafluoro-3,6,9-12-tetroxa-1-tetradecanol, B.P. 177° C., and ammonium bis(1H,1H-nonadecafluoro-3,6,9,12-tetroxatetradecyl) phosphate is obtained in 89% yield. Analysis is as follows.

Calculated for $C_{20}H_8F_{38}NO_{12}P$: C=19.9%; H=0.7%; F=59.8%; N=1.2%; P=2.6%. Found: C=20.3%; H=0.7%; F=60.4%; N=1.1%; P=2.6%.

*Example XIII.—Ammonium bis(1H,1H-pentadecafluoro-3,6,9-trioxahendecyl) phosphate*

A dry, nitrogen blanketed reactor is charged with 14.78 parts (0.033 mol) of 1H,1H-pentadecafluoro-3,6,9-trioxa-1-hendecanol, B.P. 149° C., 2.07 parts (0.015 mol) of diethyl phosphite [$(RO)_2PHO$] and 6.5 parts of m-xylene. The mixture is refluxed for 30 hours and ethanol is removed as it forms. The reaction product is fractionally distilled under vacuum, and 5.40 parts of bis(1H,1H-pentadecafluoro-3,6,9-trioxahendecyl) phosphite was obtained at 95° to 98° C. at 0.3 mm. Hg pressure. This phosphite has a density, $d_4^{25}$, of 1.6971 and an analysis as follows.

Calculated for $C_{16}H_5F_{30}O_9P$: C=20.4%; H=0.5%; F=60.5%; P=3.3%. Found: C=20.5%; H=0.4%; F=60.2%; P=3.2%.

Into 2.5 parts of the above-prepared agitated polyfluorohendecyl phosphite is passed dry nitrogen dioxide, keeping the temperature below 50° C., until the brown color of nitrogen dioxide persists in the liquid. The material is then purged with nitrogen to remove the excess nitrogen dioxide. The resultant bis(1H,1H-pentadecafluoro-3,6,9-trioxahendecyl) phosphate in the form of the free acid has the following analysis.

Calculated for $C_{16}H_5F_{30}O_{10}P$: C=20.1%; H=0.5%; F=59.5%; P=3.2%. Found: C=19.9%; H=0.4%; F=59.9%; P=3.2%.

This acid phosphate is dissolved in ether and treated with ammonia gas to form the ammonium salt of the formula:

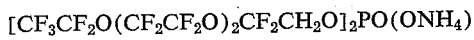

[$CF_3CF_2O(CF_2CF_2O)_2CF_2CH_2O$]$_2PO(ONH_4)$

*Example XIV.—Ammonium bis [1H,1H-hendecafluoro-2,5-bis(trifluoromethyl)-3,6-dioxanonyl] phosphate*

By the procedure of Example XII, 9.66 parts (0.02 mol) of 1H,1H-hendecafluoro-2,5-bis(trifluoromethyl)-3,6-dioxa-1-nonanol is reacted with 1.53 parts (0.01 mol) of phosphorus oxychloride with subsequent hydrolysis and treatment with ammonia to provide the desired ammonium bis[1H,1H - hendecafluoro - 2,5 - bis(trifluoromethyl)-3,6-dioxanonyl] phosphate which is identified by the following analytical results.

Calculated for $C_{18}H_8F_{34}NO_8P$: C=20.7%; H=0.8%; F=61.9%; N=1.3%; P=3.0%. Found: C=21.1%; H=0.8%; F=60.0%; N=1.4%; P=3.3%.

As previously mentioned, the phosphates of the present invention possess oil-repellent properties and they may be applied to a wide variety of materials to impart oil repellency thereto, including textile fabric, textile yarn, leather, paper, plastic sheeting, wood, ceramic clays, as well as manufactured articles made therefrom, for instance, wearing apparel, wall paper, paper bags, cardboard boxes, porous earthenware, etc. The new compounds are well adapted for imparting oil-repellency to paper and paper products by treating pulp with the oil-repellency compound at the machine chest or head box stage in paper manufacture.

The treatment of water-insoluble materials with the invention compounds to render materials oil-repellent may be done by padding, exhaustion, spraying, or brushing using aqueous solutions of the agents. The amount of oil-repellent deposited on the material will vary from 0.03% to 3% by weight of the material. The preparation of the aqueous solutions may be facilitated by first dissolving the phosphate agent in an organic solvent such as acetone, methanol, ethanol, or isopropanol or mixtures of these solvents, followed by dilution with water. Alternately a solution of the free acid phosphate in an organic solvent may be diluted with an aqueous amine or ammonia solution.

A preferred procedure in treating materials to render them oil-repellent is to employ in combination with the invention phosphate a water-soluble polymer containing cationic nitrogen whereby to endow said material with the power of exhausting the phosphate from the aqueous bath. Examples of cationic polymeric materials suitable for use with the invention phosphates are the polymers or copolymers of quaternary derivatives or acid salts of esters of a dialkylamino alkanol and acrylic acid or methacrylic acid, water-soluble urea resins possessing cationic N-atoms, melamine-formaldehyde resins possessing cationic N-atoms, the quaternized or acid salts of polymerized ethyleneimine, and cationically-modified nitrogen-containing starches. The quantity of cationic agent added may vary from 0.05% to 10% on the weight of the material being treated, while that of the phosphate, as already mentioned, may be from 0.03% to 3%. The order of treatment of the solid material with the polyfluoropolyoxa-alkyl phosphate and polymeric cationic N-containing material is immaterial, provided care is taken to eliminate or to minimide contact between the two agents except when either of them is in contact with the solid material being treated. This means that the cationic agent may be applied first and then after a little time to permit complete exhaustion of the agent onto the material being treated, the fibers of a pulp or textile, for example, the polyfluoropolyoxa phosphate may be applied. Or the reverse sequence may be followed.

To demonstrate the oil-repellent properties of the phosphates of this invention, the following tests were carried out:

To an agitated dispersion of 4 g. (dry basis) of unbleached kraft pulp in 300 ml. of water is added 5 g. of an aqueous 0.4% solution of polymerized 2-(diethylmethylammonio)ethyl methacrylate methosulfate (0.5% of the polymer on the dry weight of the pulp to exhaust the oil-repellent phosphate ester onto the pulp fibers). Agitation is continued for five minutes and then a quantity of the phosphate ester in the form of its ammonium salt dissolved in an aqueous or an acetone-water solution is added. (This quantity varies from 0.05% on the dry weight of the pulp to 0.2%.) After additional stirring for five minutes the treated pulp is poured into one gallon of water in an 8" x 8" handsheet mold fitted with a 150-mesh screen, drained, pressed, and dried on a rotary drier at about 180° F.

Oil-repellency of the treated paper is demonstrated by placing drops of peanut oil on the surface of the paper and noting the time required for the first noticeable mark of penetration of the oil to appear on the underside of the sheet. From these data the lowest concentration of phosphate ester which repels the peanut oil for at least 30 minutes is noted. The untreated paper is penetrated immediately by the oil. A summary of the results of this repellency test is given in Table 1.

TABLE 1.—OIL-REPELLENCY OF PAPER TREATED WITH PHOSPHATE ESTERS

| Phosphate Ester, Ammonium Salt of— | Amount of ester to repel peanut oil for at least 30 minutes, in percent on wt. of paper |
|---|---|
| Bis(1H,1H-hendecafluoro-3,6-dioxaoctyl) phosphate | 0.07 |
| Bis(1H,1H-pentadecafluoro-3,6,9-trioxahendecyl) phosphate | 0.10 |
| Bis(1H,1H-nonadecafluoro-3,6,9,12-tetroxatetradecyl) phosphate | 0.11 |
| Bis[1H,1H-hendecafluoro-2,5-bis(trifluoromethyl)-3,6-dioxanonyl] phosphate | 0.08 |

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. Compounds of the structure $$XCF_2CF_2O(CFXCF_2O)_nCFXCH_2OH$$

wherein $n$ is an integer of from one to fifty and X is selected from the group consisting of fluorine and the trifluoromethyl group and wherein all X's are the same.

2. The compound of the structure $$CF_3CF_2CF_2O[CF(CF_3)CF_2O]_2CF(CF_3)CH_2OH$$

3. The compound of the structure $$CF_3CF_2CF_2O[CF(CF_3)CF_2O]_4CF(CF_3)CH_2OH$$

4. The compound of the structure $$CF_3CF_2O(CF_2CF_2O)_3CF_2CH_2OH$$

5. The compound of the structure $$CF_3CF_2O(CF_2CF_2O)_9CF_2CH_2OH$$

References Cited by the Examiner

UNITED STATES PATENTS

| | | | |
|---|---|---|---|
| 2,713,593 | 7/1955 | Brice et al. | 260—615 XR |
| 2,723,999 | 11/1955 | Cowen et al. | 260—615 |
| 2,839,513 | 6/1958 | Ahlbrecht et al. | 260—615 XR |
| 2,965,678 | 12/1960 | Sundberg et al. | 260—615 |
| 3,083,224 | 3/1963 | Brace et al. | 260—461 |
| 3,094,547 | 6/1963 | Heine | 260—461 |

FOREIGN PATENTS 528,136  7/1956  Canada.

OTHER REFERENCES

Filler, R., et al.: Jour. Am. Chem. Soc., vol. 75 pages 2693–2695 (1953).

Chaikin S., et al.: Jour. Am. Chem. Soc., vol. 71 pages 122–5 (1949).

McBee et al.: Jour. Am. Chem. Soc., vol. 74 (1951), pages 3022–3023.

Schechter, W., et al.: "Boron Hydrides and Related Compounds," Callery Chemical Company (1959), page 50.

LEON ZITVER, *Primary Examiner.*

CHARLES B. PARKER, *Examiner.*

F. M. SIKORA, H. T. MARS, *Assistant Examiners.*